US010885796B2

(12) United States Patent
Sinha et al.

(10) Patent No.: US 10,885,796 B2
(45) Date of Patent: Jan. 5, 2021

(54) GROUND TRAFFIC AIRCRAFT MANAGEMENT (71) Applicant: Honeywell International Inc., Morris Plains, NJ (US)

(72) Inventors: Ankita Sinha, Bangalore (IN); Andrea Antonini, Dubai (AE); Dinesh Ramalingam, Bangalore (IN); John Joyson, Reading (GB); Maksood Kadike, Dubai (AE)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/401,897

(22) Filed: May 2, 2019

(65) Prior Publication Data
US 2020/0349855 A1 Nov. 5, 2020

(51) Int. Cl.
*G08G 5/00* (2006.01)
*G06F 3/0481* (2013.01)
*G06F 3/0488* (2013.01)
*G06F 3/0484* (2013.01)

(52) U.S. Cl.
CPC ......... *G08G 5/0082* (2013.01); *G06F 3/0481* (2013.01); *G06F 3/0484* (2013.01); *G06F 3/04883* (2013.01)

(58) Field of Classification Search
CPC combination set(s) only.
See application file for complete search history.

(56) References Cited

U.S. PATENT DOCUMENTS

| 5,659,475 | A  | * | 8/1997  | Brown     | G08G 5/0026 |
|           |    |   |         |           | 701/120     |
| 6,393,358 | B1 | * | 5/2002  | Erzberger | G01S 7/22   |
|           |    |   |         |           | 340/961     |
| 9,355,567 | B2 | * | 5/2016  | Krishna   | B64C 25/44  |
| 9,478,140 | B2 | * | 10/2016 | Kathirvel | G08G 5/0043 |
| 2003/0009278 | A1 | * | 1/2003 | Mallet | G08G 5/065 |
|           |    |   |         |           | 701/120     |
| 2009/0118997 | A1 | * | 5/2009 | Truitt | G08G 5/0026 |
|           |    |   |         |           | 701/120     |
| 2009/0143968 | A1 | * | 6/2009 | Truitt | G08G 5/0082 |
|           |    |   |         |           | 701/120     |
| 2011/0199239 | A1 | * | 8/2011 | Lutz   | G08G 5/065 |
|           |    |   |         |           | 340/995.14  |
| 2011/0214050 | A1 | * | 9/2011 | Stambaugh | G06F 3/04817 |
|           |    |   |         |           | 715/234     |
| 2013/0113819 | A1 | * | 5/2013 | Gurusamy | G08G 5/0021 |
|           |    |   |         |           | 345/592     |

(Continued)

*Primary Examiner* — Hien L Duong
(74) *Attorney, Agent, or Firm* — Brooks, Cameron & Huebsch, PLLC (57) ABSTRACT

Methods, devices, and systems for ground traffic aircraft management are described herein. One device includes a user interface, a memory, and a processor configured to execute executable instructions stored in the memory to receive airport information associated with an airport, generate, using the airport information, a map of the airport, display an intersection on the map of the airport, receive a selection of the intersection, and display flight information of each of a plurality of aircraft passing through the intersection within a particular period of time and the map of the airport in a single integrated display responsive to receiving the selection of the intersection.

20 Claims, 7 Drawing Sheets

(56) References Cited

U.S. PATENT DOCUMENTS

| | | | |
|---|---|---|---|
| 2014/0236465 A1* | 8/2014 | Greenlaw | G08G 5/00 701/120 |
| 2015/0338942 A1* | 11/2015 | Stone | G06F 3/0488 345/173 |
| 2016/0012737 A1* | 1/2016 | Zimmer | G08G 5/0013 701/120 |
| 2016/0052641 A1* | 2/2016 | Olofinboba | G08G 5/0013 340/978 |
| 2016/0057032 A1* | 2/2016 | Tieftrunk | G01C 21/00 701/533 |
| 2016/0328977 A1* | 11/2016 | Lueck | G01C 23/00 |
| 2017/0183105 A1* | 6/2017 | Fournier | G01C 21/00 |
| 2018/0101933 A1* | 4/2018 | Rasmussen | G09B 29/10 |
| 2018/0218620 A1* | 8/2018 | Kalyan | G08G 5/0082 |

\* cited by examiner

GROUND TRAFFIC AIRCRAFT MANAGEMENT

TECHNICAL FIELD

The present disclosure relates to methods, devices, and systems for ground traffic aircraft management.

BACKGROUND

Air traffic control (ATC) at an airport can direct aircraft in the air and on the ground in an airport. Directing aircraft on the ground can prevent collisions between aircraft, organize and expedite aircraft traffic, and provide information and/or support for aircraft pilots.

ATC can use many different technologies in directing aircraft. For example, ATC can use paper flight strips that record flight movements and the corresponding tasks for those flight movements. As another example, ATC can use different displays and/or user interfaces that can show an ATC controller information including ground radar, air radar, weather information, etc.

ATC may need to direct many aircraft in and around the airport. To direct these aircraft safely and efficiently, ATC controllers may need to utilize many different displays and/or user interfaces. For instance, an ATC controller may need to utilize many different displays and/or user interfaces to determine information regarding different aircraft, prioritize those aircraft, and take actions to safely and efficiently direct those aircraft. Having to utilize many different displays can be challenging, leading to safety issues and delays for passengers and/or airlines.

DETAILED DESCRIPTION

Methods, devices, and systems for ground traffic aircraft management are described herein. For example, an embodiment includes a user interface, a memory, and a processor configured to execute executable instructions stored in the memory to receive airport information associated with an airport, generate, using the airport information, a map of the airport, display an intersection on the map of the airport, receive, a selection of the intersection, and display flight information of each of a plurality of aircraft passing through the intersection within a particular period of time and the map of the airport in a single integrated display responsive to receiving the selection of the intersection.

Ground traffic aircraft management, in accordance with the present disclosure, can allow an ATC controller to quickly gain situational awareness of airport operations in an airport. A map of the airport and aircraft flight information can be shown in a single integrated display. Presenting a map of the airport and aircraft flight information in a single integrated display, that can be manipulated by the ATC controller, can allow an ATC controller to quickly view and analyze ground traffic, determine priority (e.g., sequence) of aircraft, and communicate the priority with aircraft.

During, for example, an intersection conflict, an ATC controller can be made aware (e.g., alerted, warned, etc.) of the intersection conflict, view the aircraft default priority of the intersection, view flight information of the aircraft, and change the aircraft priority of the intersection in a single integrated display. The single integrated display can assist ATC controllers to make more informed ground traffic decisions faster to provide safer and more efficient flow of ground traffic and reduce delays for passenger and/or airlines.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component. Additionally, the designators "X", "Y", and "Z" as used herein, particularly with respect to reference numerals in the drawings, indicate that a number of the particular feature so designated can be included with some embodiments of the present disclosure. This number may be the same or different between designations.

Figure 1:
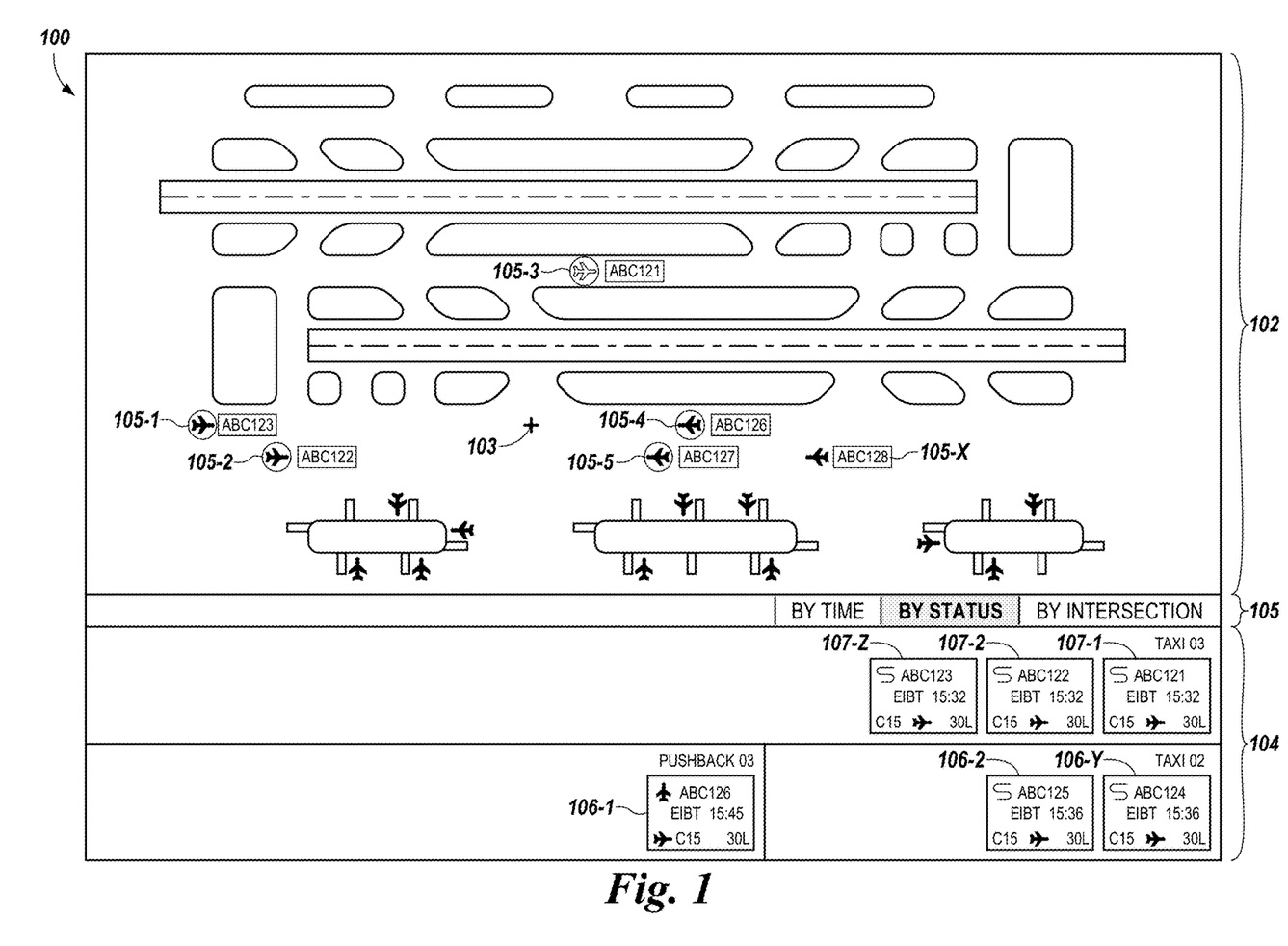
FIG. 1 illustrates an example of a single integrated display provided on a user interface for ground traffic aircraft management including an intersection in accordance with an embodiment of the present disclosure.

FIG. 1 illustrates an example of a single integrated display 100 provided on a user interface (e.g., user interface 866, as described in connection with FIG. 8) for ground traffic aircraft management including an intersection 103 in accordance with an embodiment of the present disclosure. The integrated display 100, as illustrated in FIG. 1, can further include an airport map 102, a card panel 104, and a view toggle 105. The airport map 102 can include a plurality of aircraft 105-1, 105-2, . . . , 105-X and the card panel 104 can include a plurality of flight cards 106-1, 106-2, . . . , 106-Y and 107-1, 107-2, . . . , 107-Z.

The single integrated display 100 can be generated by a computing device (e.g., computing device 860, as described in connection with FIG. 8) including the airport map 102 and the card panel 104 based on airport information associated with an airport received by the computing device. Airport information associated with an airport can be received by the computing device from flight information systems associated with the airport and/or other airports, a flight data processing system, an airport operations database associated with the airport and/or other airports, and/or another third-party system. In some examples, the single integrated display 100 can be generated in response to an input from an ATC controller (e.g., a user).

As used herein, an ATC controller can be a user (e.g., a person) associated with the airport operator or air navigational service provider entrusted with the responsibility of providing ground and air traffic services to aircraft and/or other vehicles. An airport can include multiple ATC controllers, who can use the single integrated display 100.

The single integrated display 100 can include an airport map 102 showing locations of aircraft 105-1, 105-2, . . . , 105-X at the airport. As used herein, an aircraft 105-1, 105-2, . . . , 105-X refers to a machine that is able to fly by gaining support from the air. The airport map 102 can show the locations of various aircraft 105-1, 105-2, . . . , 105-X in and/or around the airport, as well as other vehicles such as "follow-me" vehicles, maintenance vehicles, etc.

Aircraft 105-1, 105-2, . . . , 105-X taxiing may be shown along taxiways on airport map 102. As used herein, taxiing may refer to the movement of an aircraft 105-1, 105-2, . . . , 105-X on the ground. In some examples, aircraft 105-1, 105-2, . . . , 105-X that are parked at a parking stand or a gate may be shown at the corresponding parking stand or gate on airport map 102. In some examples, aircraft 105-1, 105-2, . . . , 105-X that are taking off or landing may be shown on or near a runway of the airport on airport map 102.

The single integrated display 100 can include an airport map 102 showing locations of intersections, for example intersection 103. As used herein, an intersection refers to an aircraft crossing on a runway and/or taxiway.

The single integrated display 100 can include a card panel 104. As used herein, a card panel refers to a method of organizing and/or annotating flights of aircraft 105-1, 105-2, . . . , 105-X. Card panel 104 can include departure flight cards 106-1, 106-2, . . . , 106-Y and arrival flight cards 107-1, 107-2, . . . , 107-Z, as will be further described herein with respect to FIGS. 3 and 4. Each of the flight cards 106-1, 106-2, . . . , 106-Y and 107-1, 107-2, . . . , 107-Z can correspond to a different respective one of the aircraft 105-1, 105-2, . . . , 105-X at the airport. For example, a flight card 107-1 can correspond to aircraft 105-3 shown on airport map 102. Card panel 104 can be shown in a timeline view, a clearance status view, and/or an intersection view. The single integrated display 100 can include a toggle 105. The toggle 105 can change the view of card panel 104.

As illustrated in FIG. 1, card panel 104 is shown in a clearance status view. The clearance status view of card panel 104 shows the flight cards 106-1, 106-2, . . . , 106-Y and 107-1, 107-2, . . . , 107-Z grouped by clearance status. As used herein, clearance status refers to permissions for an aircraft 105-1, 105-2, . . . , 105-X to take an action. For instance, the flight cards 106-1, 106-2, . . . , 106-Y and 107-1, 107-2, . . . , 107-Z can be grouped based on clearance status of each of the aircraft 105-1, 105-2, . . . , 105-X corresponding to their respective flight cards 106-1, 106-2, . . . , 106-Y and 107-1, 107-2, . . . , 107-Z.

Figure 2:
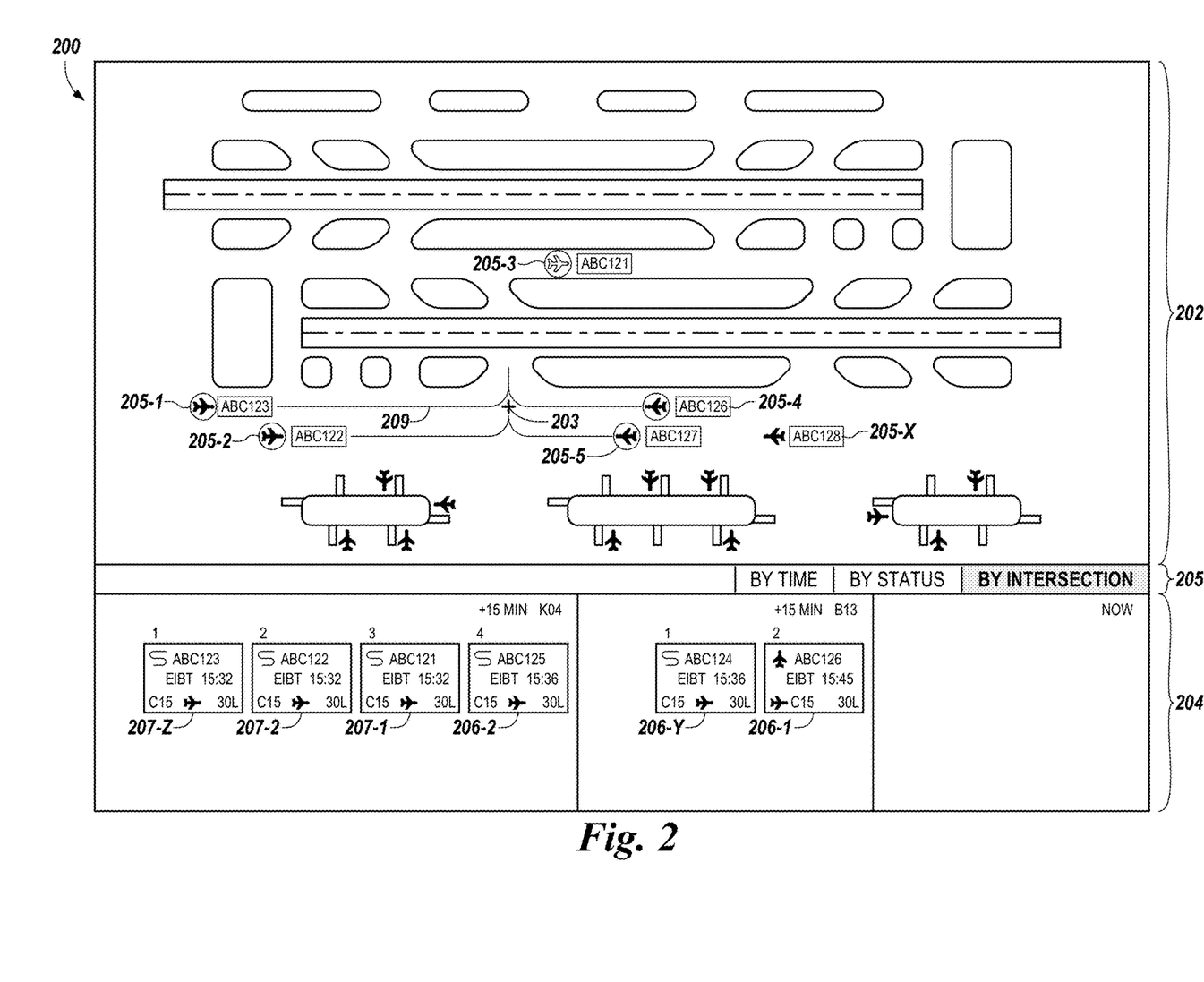
FIG. 2 illustrates an example of a single integrated display provided on a user interface for ground traffic aircraft management including a plurality of aircraft routes in accordance with an embodiment of the present disclosure.

FIG. 2 illustrates an example of a single integrated display 200 provided on a user interface (e.g., user interface 866, as described in connection with FIG. 8) for ground traffic aircraft management including a plurality of aircraft routes 209 in accordance with an embodiment of the present disclosure. The single integrated display 200, as illustrated in FIG. 2, can further include an airport map 202, a card panel 204, and a view toggle 205. The airport map 202 can include a plurality of aircraft 205-1, 205-2, . . . , 205-X and the card panel 204 can include a plurality of flight cards 206-1, 206-2, . . . , 206-Y and 207-1, 207-2, . . . , 207-Z.

The single integrated display 200 can be generated by a computing device (e.g., computing device 860, as described in connection with FIG. 8) including the airport map 202 and the card panel 204 based on airport information associated with an airport received by the computing device. In some examples, the single integrated display 200, as illustrated in FIG. 2, can be generated in response to receiving a selection of the intersection 203 from an ATC controller (e.g., a user) and/or receiving a selection via toggle 205 to change the view of card panel 204 to an intersection view.

Although not shown for clarity and so as not to obscure embodiments of the present disclosure, intersection 203 shown on airport map 202 may be displayed in a particular color and/or highlighted. For example, intersection 203 may be a particular color and/or highlighted to alert (e.g., warn) the ATC controller of an intersection conflict. An intersection conflict can occur responsive to a plurality of aircraft 205-1, 205-2, . . . , 205-X passing through an intersection within a particular time period. The time period can be such that the plurality of aircraft 205-1, 205-2, . . . , 205-X could collide if each aircraft 205-1, 205-2, . . . , 205-X were not directed to hold and/or continue movement from the ATC controller. In some examples, the time period can be set by the ATC controller.

The plurality of routes 209 of the plurality of aircraft 205-1, 205-2, . . . , 205-X passing through intersection 203 within a particular period of time can also be displayed in the single integrated display 200 responsive to the ATC controller selecting intersection 203, for example. As used herein, a route refers to a course an aircraft will be taking on a taxiway and/or runway. Displaying the plurality of routes 209 allows the ATC controller to see where each of the plurality of aircraft 205-1, 205-2, . . . , 205-X are going.

Although not shown for clarity and so as not to obscure embodiments of the present disclosure, aircraft 205-1, 205-2, . . . , 205-X shown on airport map 202 passing through intersection 203 within a particular period of time may be displayed in a particular color. In some examples, aircraft 205-1, 205-2, . . . , 205-X passing through intersection 203 within a particular period of time may be displayed in a particular color responsive to the ATC controller selecting intersection 203.

The single integrated display 200 can include a card panel 204. The card panel 204 can include departure flight cards 206-1, 206-2, . . . , 206-Y and arrival flight cards 207-1, 207-2, . . . , 207-Z, as will be further described herein with respect to FIGS. 3 and 4.

As illustrated in FIG. 2, card panel 204 is shown in an intersection view. The intersection view of card panel 204 shows the flight cards 206-1, 206-2, . . . , 206-Y and 207-1, 207-2, . . . , 207-Z grouped by intersection in the single integrated display 200. In some examples, flight cards 206-1, 206-2, . . . , 206-Y and 207-1, 207-2, . . . , 207-Z, corresponding to aircrafts 205-1, 205-2, . . . , 205-X passing through an intersection 203 within a particular period of time, may be grouped together. Grouping the flight cards 206-1, 206-2, . . . , 206-Y and 207-1, 207-2, . . . , 207-Z, corresponding to aircraft 205-1, 205-2, . . . , 205-X passing through the intersection 203 within a particular period of time can allow an ATC controller to easily view and analyze all the flight information of the aircrafts 205-1, 205-2, . . . , 205-X to determine the priority (e.g., sequence) of the aircrafts 205-1, 205-2, . . . , 205-X passing through the intersection 203.

The flight cards 206-1, 206-2, . . . , 206-Y and 207-1, 207-2, . . . , 207-Z can be displayed in order of priority. For example, an aircraft of the plurality of aircrafts 205-1, 205-2, . . . , 205-X that will be going through the intersection 203 first can correspond to the furthest flight card 207-Z to the left of the card panel 204 and the aircraft of the plurality of aircrafts 205-1, 205-2, . . . , 205-X that will be going through the intersection 203 last can correspond to the furthest flight card 206-2 to the right of the card panel 204 within the intersection 203 flight card grouping. In some examples, each of the plurality of flight cards 206-1, 206-2, . . . , 206-Y and 207-1, 207-2, . . . , 207-Z can include a priority number of the corresponding aircraft 205-1, 205-2, . . . , 205-X passing through the intersection 203.

The ATC controller can set an order of priority of the plurality of aircraft 205-1, 205-2, . . . , 205-X passing through the intersection 203 using the flight cards 206-1, 206-2, . . . , 206-Y and 207-1, 207-2, . . . , 207-Z. An order of priority can be set by selecting (e.g., clicking on and/or touching) each of the plurality of flight cards 206-1, 206-2, . . . , 206-Y and 207-1, 207-2, . . . , 207-Z in the order of priority and/or selecting one of the plurality of flight cards 206-1, 206-2, . . . , 206-Y and 207-1, 207-2, . . . , 207-Z and moving it from a first position in an order of priority of the plurality of flight cards 206-1, 206-2, . . . , 206-Y and 207-1, 207-2, . . . , 207-Z to a second position in the order of priority of the plurality of flight cards 206-1, 206-2, . . . , 206-Y and 207-1, 207-2, . . . , 207-Z.

Although not shown for clarity and so as not to obscure embodiments of the present disclosure, flight cards 206-1, 206-2, . . . , 206-Y and 207-1, 207-2, . . . , 207-Z shown in the intersection view of card panel 204 may be displayed in a particular color. In some examples, flight cards 206-1, 206-2, . . . , 206-Y and 207-1, 207-2, . . . , 207-Z may be displayed in a particular color responsive to the ATC controller selecting via toggle 205 to display the flight cards 206-1, 206-2, . . . , 206-Y and 207-1, 207-2, . . . , 207-Z by intersection. The flight cards 206-1, 206-2, . . . , 206-Y and 207-1, 207-2, . . . , 207-Z can be displayed in a particular color based on their corresponding aircraft 205-1, 205-2, . . . , 205-X passing through a particular intersection within a particular period of time. For example, flight cards 207-Z, 207-2, 207-1, and 206-2, as shown in FIG. 2, are grouped together and can correspond to a first intersection and flight cards 206-Y and 206-1 are grouped together and can correspond to a second intersection. Flight cards 207-Z, 207-2, 207-1, and 206-2 can be displayed in a first color and flight cards 206-Y and 206-1 can be displayed in a second color to indicate which intersection each of the flight cards 206-1, 206-2, . . . , 206-Y and 207-1, 207-2, . . . , 207-Z correspond to.

Figure 3:
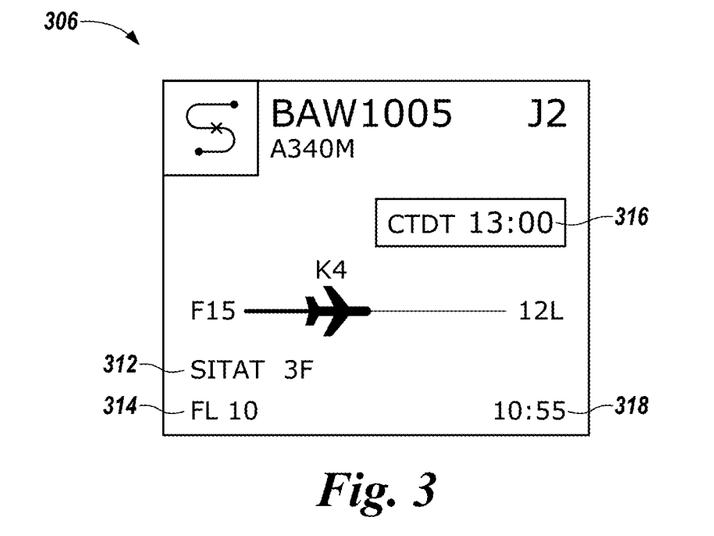
FIG. 3 illustrates an example of a departure flight card provided on a user interface for ground traffic aircraft management in accordance with an embodiment of the present disclosure.

FIG. 3 illustrates an example of a departure flight card 306 provided on a user interface (e.g., user interface 866, as described in connection with FIG. 8) for ground traffic aircraft management in accordance with an embodiment of the present disclosure. The departure flight card 306 can include flight information. The flight information can include, but is not limited to, a standard instrument departure (SID) route 312, a target time 316, a flight level approved 314, and/or a start up time requested 318.

The SID 312 can be a departure procedure followed by an aircraft after takeoff from an airport. The target time 316 can be a calculated take off time. The flight level approved 314 can be a flight level approved by the ATC controller. The start up time requested 318 can be a time requested by the pilot to start up the aircraft. This flight information can be used by the ATC controller to prioritize aircraft, for example.

Figure 4:
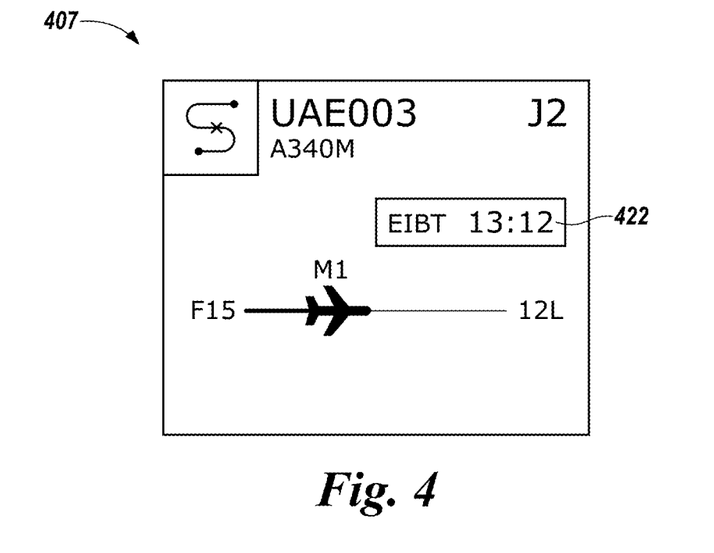
FIG. 4 illustrates an example of an arrival flight card provided on a user interface for ground traffic aircraft management in accordance with an embodiment of the present disclosure.

FIG. 4 illustrates an example of an arrival flight card 407 provided on a user interface (e.g., user interface 866, as described in connection with FIG. 8) for ground traffic aircraft management in accordance with an embodiment of the present disclosure. The arrival flight card 407 can include flight information. The flight information can include, but is not limited to, a target time 422.

The target time 422 can be an estimated in block time. An estimated in block time can be the time an aircraft arrives at the destination gate. The flight information including the target time 422 can be used by the ATC controller to prioritize aircraft, for example.

Figure 5:
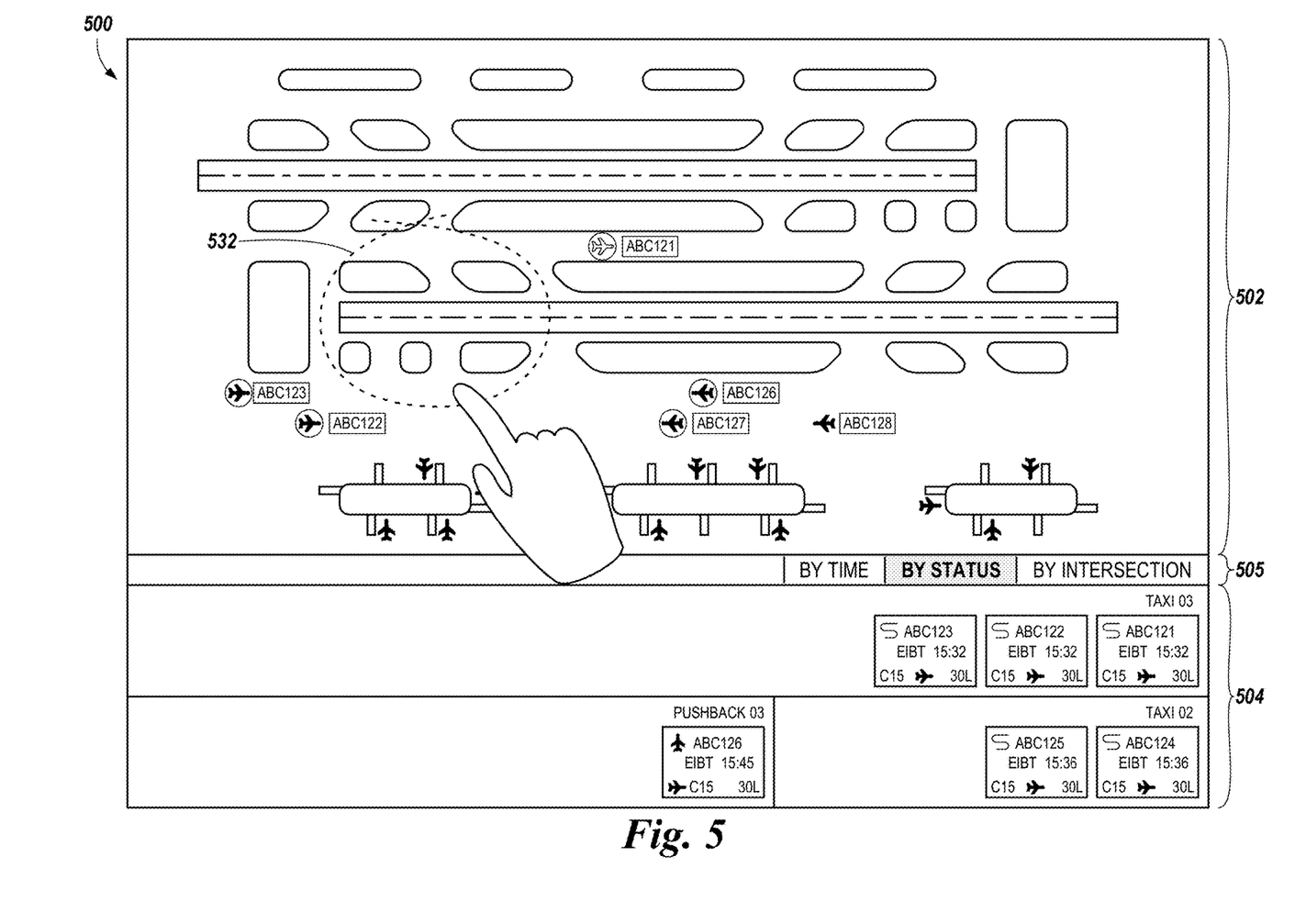
FIG. 5 illustrates an example of a single integrated display provided on a user interface for ground traffic aircraft management including a selected area in accordance with an embodiment of the present disclosure.

FIG. 5 illustrates an example of a single integrated display 500 provided on a user interface (e.g., user interface 866, as described in connection with FIG. 8) for ground traffic aircraft management including a selected area 532 in accordance with an embodiment of the present disclosure. The single integrated display 500, as illustrated in FIG. 5, can further include an airport map 502, a card panel 504, and a view toggle 505.

The single integrated display 500 can be generated by a computing device (e.g., computing device 860, as described in connection with FIG. 8) including the airport map 502 and the card panel 504 based on airport information associated with an airport received by the computing device.

In some examples, the single integrated display 500, as illustrated in FIG. 5, provided on a user interface (e.g., user interface 866, as described in connection with FIG. 8) can receive a selection of a portion of the airport map 502 from an ATC controller. In some examples, the selection can be a touch selection and the ATC controller can use his finger to generate a magnification window of the selected portion of the airport map 502. The selected area 532 of the airport map 502 can be an enclosed area. For example, the selected area 532 of the airport map 502 can be a closed irregular shape including, but not limited to, a polygon.

In some examples, the selected area 532 can be an area that needs special attention from the ATC controller. For example, the selected area 532 can be a runway entry point, a congested area, and/or an area prone to intersection conflicts.

Figure 6:
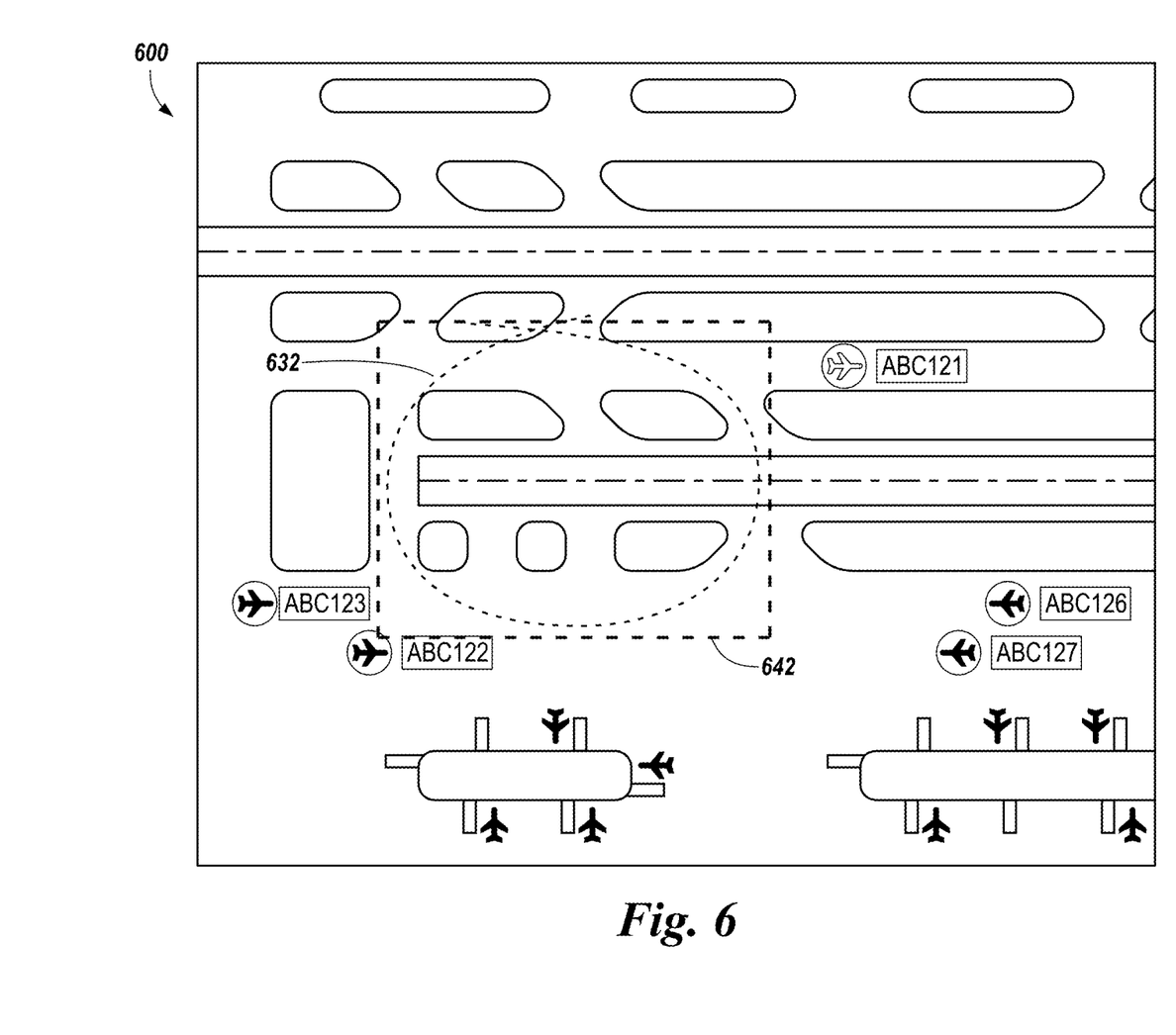
FIG. 6 illustrates an example of a rectangle enclosing a selected area of the display provided on a user interface in accordance with an embodiment of the present disclosure.

FIG. 6 illustrates an example of a rectangle 642 enclosing a selected area 632 of a single integrated display 600 provided on a user interface (e.g., user interface 866, as described in connection with FIG. 8) in accordance with an embodiment of the present disclosure.

The rectangle 642 can be generated by a computing device (e.g., computing device 860, as described in connection with FIG. 8) responsive to receiving a touch selection of a portion of the airport map on the user interface (e.g., user interface 866, as described in connection with FIG. 8). The computing device can compute the rectangle 642 enclosing the selected area 632 and create a magnification window of the rectangle 642 including the selected area 632. In some examples, the rectangle 642 can be a different shape including, but not limited to, a square or a circle. For example, a square or a circle can be used to enclose the selected area 632 and a magnification window can be created in the shape of a square or a circle, respectively.

Figure 7:
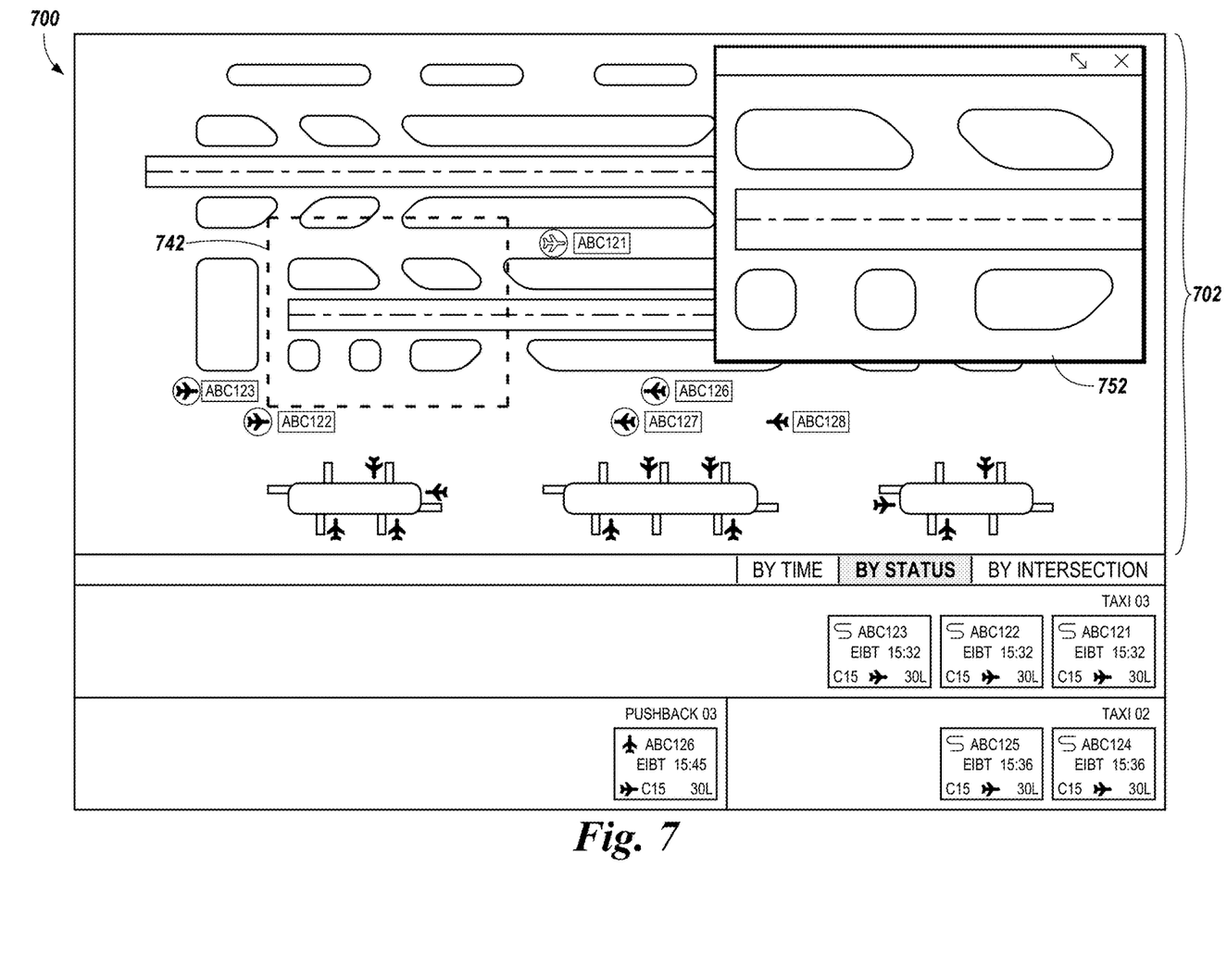
FIG. 7 illustrates an example of a single integrated display provided on a user interface for ground traffic aircraft management including an airport map and a magnification window of a selected area of the airport map in accordance with an embodiment of the present disclosure.

FIG. 7 illustrates an example of a single integrated display 700 provided on a user interface (e.g., user interface 866, as described in connection with FIG. 8) for ground traffic aircraft management including an airport map 702 and a magnification window 752 of a selected area of the airport map 702 in accordance with an embodiment of the present disclosure. In some examples, the selected area can be enclosed by a shape, for example, a rectangle 742 (e.g., rectangle 642, as described in connection with FIG. 6) and the magnification window 752 can be the area of the rectangle 742.

The magnification window 752 can enable the ATC controller to multi-task. For example, the ATC controller can watch the selected area in the magnification window 752 and set an intersection priority in parallel.

In some examples, the single integrated display 700, as illustrated in FIG. 7, provided on a user interface (e.g., user interface 866, as described in connection with FIG. 8) can receive a gesture on the magnification window 752 from an ATC controller. In some examples, the gesture can be a touch gesture. The magnification window 752 can be moved from one location on the single integrated display to a second location on the single integrated display, rotated, enlarged, or compressed in the single integrated display 700 responsive to receiving a gesture on the user interface. For example, the magnification window 752 can be enlarged responsive to a pinch in gesture and compressed responsive to a pinch out gesture.

Figure 8:
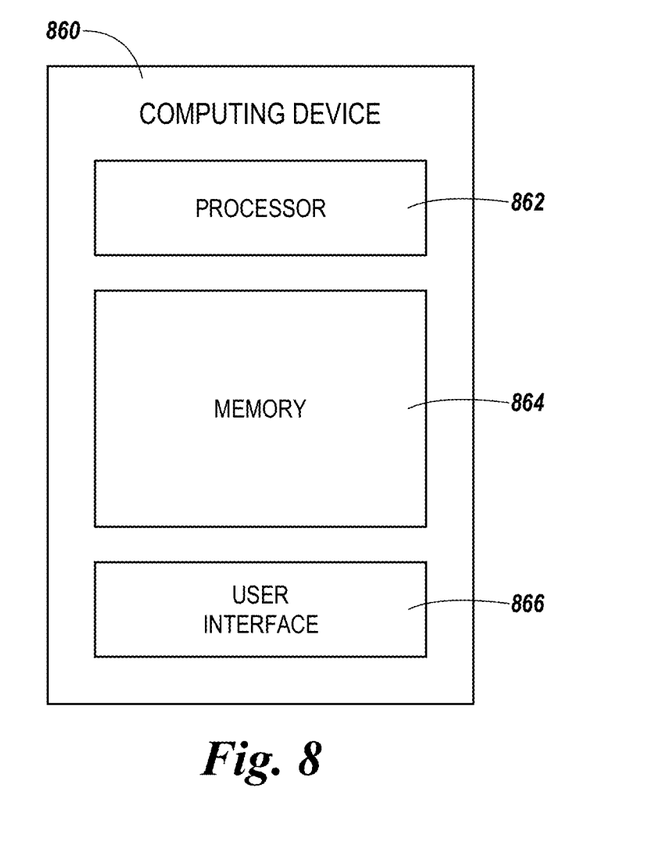
FIG. 8 illustrates an example of a computing device for ground traffic aircraft management in accordance with an embodiment of the present disclosure.

FIG. 8 illustrates an example of a computing device 860 for ground traffic aircraft management in accordance with an embodiment of the present disclosure. As illustrated in FIG. 8, computing device 860 can include a user interface 866, a memory 864, and a processor 862 to generate a single integrated display in accordance with the present disclosure.

Computing device 860 can be, for example, a laptop computer, a desktop computer, a mobile device (e.g., a smart phone, tablet, personal digital assistant, smart glasses, a wrist-worn device, etc.), and/or redundant combinations thereof, among other types of computing devices.

The memory 864 can be any type of storage medium that can be accessed by the processor 862 to perform various examples of the present disclosure. For example, the memory 864 can be a non-transitory computer readable medium having computer readable instructions (e.g., computer program instructions) stored thereon that are executable by the processor 862 to generate single integrated display in accordance with the present disclosure. The computer readable instructions can be executable by the processor 862 to redundantly generate the single integrated display.

The memory 864 can be volatile or nonvolatile memory. The memory 864 can also be removable (e.g., portable) memory, or non-removable (e.g., internal) memory. For example, the memory 864 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 864 is illustrated as being located within computing device 860, embodiments of the present disclosure are not so limited. For example, memory 864 can also be located internal to another computing resource (e.g., enabling computer readable instructions to be downloaded over the Internet or another wired or wireless connection).

As illustrated in FIG. 8, computing device 860 includes a user interface 866. For example, the user interface 866 can display flight information and an airport map (e.g., as previously described in connection with FIGS. 1-7) in a single integrated display. A user (e.g., operator) of computing device 860, such as an ATC controller, can interact with computing device 860 via user interface 866. For example, user interface 866 can provide (e.g., display and/or present) information to the user of computing device 860, and/or receive information from (e.g., input by) the user of computing device 860. For instance, in some embodiments, user interface 866 can be a graphical user interface (GUI) that can provide and/or receive information to and/or from the user of computing device 860. The display can be, for instance, a touch-screen (e.g., the GUI can include touch-screen capabilities). Alternatively, a display can include a television, computer monitor, mobile device screen, other type of display device, or any combination thereof, connected to computing device 860 and configured to receive a video signal output from the computing device 860.

As an additional example, user interface 866 can include a keyboard and/or mouse the user can use to input information into computing device 860. Embodiments of the present disclosure, however, are not limited to a particular type(s) of user interface.

User interface 866 can be localized to any language. For example, user interface 866 can display flight information and an airport map in a single integrated display in any language, such as English, Spanish, German, French, Mandarin, Arabic, Japanese, Hindi, etc.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computing device for ground traffic aircraft management, comprising:
   a user interface;
   a memory; and
   a processor configured to execute executable instructions stored in the memory to:
      receive airport information associated with an airport;
      generate, using the airport information, a map of the airport;
      display, on the user interface, a plurality of intersections on the map of the airport;
      receive, on the user interface, a selection of a particular intersection of the plurality of intersections; and
      display, on the user interface, flight information of each of a plurality of aircraft that will be passing through the particular intersection within a particular period of time and the map of the airport in a single integrated display responsive to receiving the selection of the particular intersection.

2. The computing device of claim 1, wherein the processor is configured to execute executable instructions stored in the memory to display, on the user interface, the flight information of each of the plurality of aircraft as a different flight card in a card panel.

3. The computing device of claim 1, wherein the processor is configured to execute executable instructions stored in the memory to display, on the user interface, the particular intersection in a particular color responsive to the plurality of aircraft that will be passing through the particular intersection within the particular period of time.

4. The computing device of claim 1, wherein the processor is configured to execute executable instructions stored in the memory to display, on the user interface, a route of each of the plurality of aircraft that will be passing through the particular intersection within the particular period of time responsive to receiving the selection of the particular intersection.

5. The computing device of claim 1, wherein the flight information of each of the plurality of aircraft that will be passing through the intersection within the particular period of time includes at least one of a standard instrument departure (SID), target time, flight level approved, or start up time requested.

6. A non-transitory computer readable medium having computer readable instructions stored thereon that are executable by a processor to:
   receive airport information associated with an airport;
   generate, using the airport information, a map of the airport;
   display a plurality of intersections on the map of the airport on a user interface;
   receive a touch selection of a of particular intersection of the plurality of intersections on the map of the airport on the user interface; and
   display the map of the airport, a magnification window of the selected particular intersection on the map of the airport, and flight information of each of a plurality of aircraft that will be passing through the particular intersection within a particular period of time simultaneously in a single integrated display on the user interface.

7. The non-transitory computer readable medium of claim 6, wherein the touch selection of the particular intersection on the map of the airport creates an enclosed area.

8. The non-transitory computer readable medium of claim 6, wherein the touch selection is an irregular polygon.

9. The non-transitory computer readable medium of claim 6, wherein the instructions are executable by the processor to display the magnification window as at least one of a rectangle, square, or circle.

10. The non-transitory computer readable medium of claim 6, wherein the instructions are executable by the processor to receive a touch gesture on the magnification window.

11. The non-transitory computer readable medium of claim 10, wherein the instructions are executable by the processor to move the magnification window in the single integrated display responsive to the touch gesture.

12. The non-transitory computer readable medium of claim 10, wherein the instructions are executable by the processor to rotate the magnification window in the single integrated display responsive to the touch gesture.

13. The non-transitory computer readable medium of claim 10, wherein the instructions are executable by the processor to enlarge the magnification window in the single integrated display responsive to the touch gesture.

14. The non-transitory computer readable medium of claim 10, wherein the instructions are executable by the processor to compress the magnification window in the single integrated display responsive to the touch gesture.

15. A computer implemented method for ground traffic aircraft management, comprising:
   receiving, by a computing device, airport information associated with an airport;
   generating, by the computing device using the airport information, a card panel including a plurality of flight cards, wherein each respective one of the plurality of flight cards represents a different aircraft at the airport;
   receiving, on a user interface of the computing device, a selection to display the plurality of flight cards by intersection; and
   displaying, on the user interface of the computing device a plurality of intersections, the plurality of flight cards grouped by each of the plurality of intersections in the card panel in a single integrated display.

16. The method of claim 15, further comprising displaying the plurality of flight cards in a particular color responsive to the selection to display the plurality of flight cards by intersection.

17. The method of claim 15, further comprising setting an order of priority of a plurality of aircraft that will be passing through an intersection responsive to receiving a selection of each of the plurality of flight cards in the order of priority.

18. The method of claim 15, further comprising displaying a priority number of an aircraft that will be passing through an intersection on a flight card of the plurality of flight cards representing the aircraft.

19. The method of claim 15, further comprising prioritizing a plurality of aircraft that will be passing through an intersection responsive to receiving a selection of one of the plurality of flight cards and moving the one of the plurality of flight cards from a first position in an order of priority of the plurality of flight cards to a second position in the order of priority of the plurality of flight cards.

20. The method of claim 19, wherein the selection is a touch selection on the user interface.

\* \* \* \* \*